UNITED STATES PATENT OFFICE.

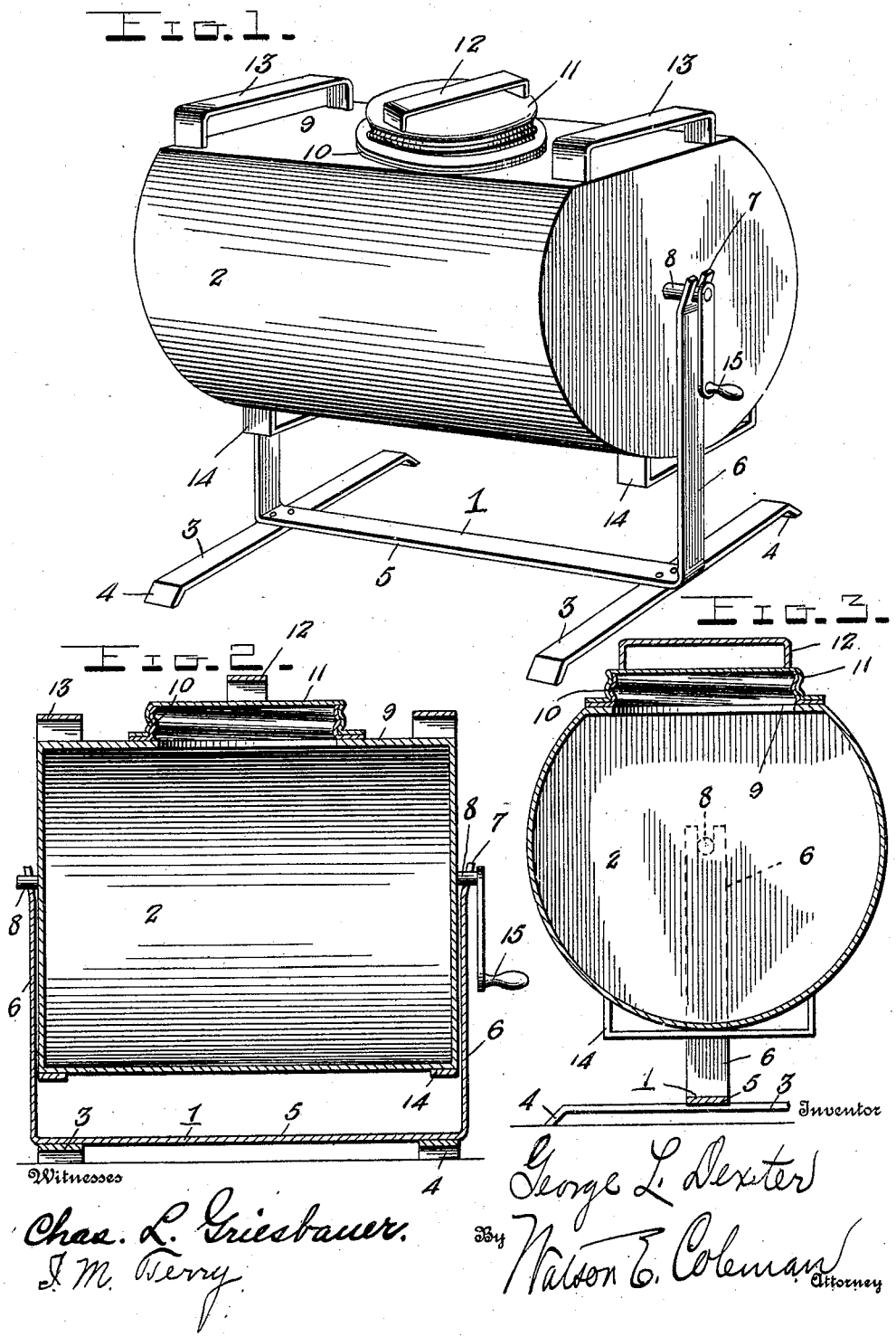

GEORGE L. DEXTER, OF LANCASTER, NEW HAMPSHIRE, ASSIGNOR OF ONE-HALF TO HORACE D. GRISWOLD, OF ST. JOHNSBURY, VERMONT.

VEGETABLE-WASHER.

No. 917,020.   Specification of Letters Patent.   Patented April 6, 1909.

Application filed July 27, 1908. Serial No. 445,554.

*To all whom it may concern:*

Be it known that I, GEORGE L. DEXTER, a citizen of the United States, residing at Lancaster, in the county of Coos and State of New Hampshire, have invented certain new and useful Improvements in Vegetable-Washers, of which the following is a specification, reference being had to the accompanying drawings.

This invention relates to improvements in washing devices for vegetables and the like and it consists of the novel features of construction and the combination and arrangement of parts hereinafter fully described and claimed.

The object of the invention is to provide a simple and practical device of this character in which a large quantity of vegetables, fruit or the like may be quickly and effectively washed.

The above and other objects of the invention are attained in its preferred embodiment illustrated in the accompanying drawings, in which—

Figure 1 is a perspective view of the improved vegetable washer; and Figs. 2 and 3 are longitudinal and transverse sectional views.

The invention comprises a support or stand 1 and a rotatable washing receptacle 2 which is removably journaled upon the former. Said stand consists of two cross bars 3 having their ends bent to form supporting feet 4 and their central portions united by a longitudinal bar 5, the ends of which latter are bent upwardly at right angles to form standards 6 between which the receptacle or body 2 is mounted for rotation. These standards or uprights 6 are preferably bent or made of angular shape, as shown, and in their upper ends are formed bearing notches 7 to receive the pivots 8 on the ends of the receptacle 2.

The washing receptacle 2 is preferably in the form of a cylinder having one side flattened, as shown at 9, to provide a top and the pivots or trunnions 8 fixed centrally upon its ends. In the center of the flattened top 9 of the receptacle is a large opening through which water and the vegetables, fruit or the like may be introduced into the receptacle. Said opening is surrounded by an upstanding screw threaded flange 10 adapted to be engaged by the screw threaded flange on a removable cover or cap 11, which latter is provided with a handle 12 for convenience in turning it on and off of the flange or neck 10. At the opposite ends of the flattened top 9 of the receptacle are formed inverted U-shaped handles 13 which permit the receptacle to be conveniently lifted on and off of the standards 6 and which also serve as supporting feet when the cover 11 is removed and the receptacle is placed in an inverted position when not in use or after being washed, while it is draining. Upon the bottom of the receptacle adjacent to its ends are similar U-shaped supporting feet 14 which serve to support the receptacle in an upright position when it is removed from the standards 6 and placed upon a table or other flat surface. The pivot stud 8 at one end of the receptacle is provided at its extremity with a crank handle 15 by means of which the receptacle may be rotated to agitate its contents.

In use, the vegetables, fruit or the like to be washed are placed in the receptacle through the opening in its flat top until it is partly full and sufficient water is then placed in it to wash the vegetables. The cover 11 is then applied and the receptacle is rotated by turning the crank 15. The rotary movement of the receptacle causes circulation of the water through the vegetables and thereby quickly and effectively removes the dirt from them.

It will be seen that the invention is exceedingly simple in construction and therefore comparatively inexpensive to manufacture and strong and durable in use. It is furthermore exceedingly convenient to handle and effective in operation.

Having thus described the invention what is claimed is:

1. A device of the character described comprising a support or stand having bearing recesses formed with open upper portions, a rotatably mounted cylindrical receptacle having a flat longitudinally extending face formed with an opening, a removable closure for said opening, pivots projecting concentrically from the ends of the receptacle and adapted to be readily inserted in and removed from said bearing recesses, handles to project beyond the flat face of the receptacle and adapted to also serve as supporting feet when the receptacle is removed from the stand and inverted on a flat surface, and supporting feet upon the receptacle at a point diametrically opposite said flat face of the receptacle, whereby the latter when removed from the stand may be supported in an upright position upon a flat surface.

2. A device of the character described comprising a support or stand having bearing recesses with open upper portions, a cylindrical washing receptacle formed with a flat longitudinally extending face, the latter having an opening, a removable closure for said opening, pivots projecting concentrically from the ends of the receptacle and adapted to be readily inserted in and removed from said bearing recesses, a crank handle upon the projecting end of one of said pivots, U-shaped handles secured on the flat face of the receptacle adjacent its ends and adapted to also serve as supporting feet for supporting the receptacle on a flat surface when the receptacle is inverted and placed on such surface to drain, and U-shaped supporting feet secured to the receptacle adjacent its ends at a point diametrically opposite its flat face to support said receptacle when in an upright position when removed from the stand and placed on a flat surface.

In testimony whereof I hereunto affix my signature in the presence of two witnesses.

GEORGE L. DEXTER.

Witnesses:
TREVOR W. MATSON,
W. H. McCARTEN.